(12) United States Patent
Soon et al.

(10) Patent No.: US 7,350,321 B2
(45) Date of Patent: Apr. 1, 2008

(54) SHOE UPPER AND METHODS OF MANUFACTURE

(75) Inventors: Seo Young Soon, Kumjung-Ku (KR); Yang Hwae Hur, Haeundae-Ku (KR); Haesuck Kwon, Haeundae-Ku (KR); Joosik Jeong, DongRae-Ku (KR)

(73) Assignee: adidas International Marketing B.V. (NL)

( * ) Notice: Subject to any disclaimer, the term of this patent is extended or adjusted under 35 U.S.C. 154(b) by 0 days.

(21) Appl. No.: 10/444,109

(22) Filed: May 22, 2003

(65) Prior Publication Data

US 2003/0233771 A1 Dec. 25, 2003

(30) Foreign Application Priority Data

May 23, 2002 (DE) ................. 102 22 897

(51) Int. Cl.
*A43B 23/00* (2006.01)
*A43D 21/00* (2006.01)

(52) U.S. Cl. ............................ 36/45; 36/49; 12/146 C; 12/142 E

(58) Field of Classification Search .................... 36/12, 36/10, 55, 45, 49, 7.1 R, 7.3; 12/146 C, 12/142 E, 142 EV, 142 F
See application file for complete search history.

(56) References Cited

U.S. PATENT DOCUMENTS

| | | | | |
|---|---|---|---|---|
| 170,332 | A | * | 11/1875 | Bibbins ............................ 36/4 |
| 547,373 | A | * | 10/1895 | Doughty ................... 12/142 R |
| 1,885,327 | A | * | 11/1932 | Burnham .................... 264/257 |
| 1,924,716 | A | * | 8/1933 | Ferrettie ........................... 36/4 |
| 2,147,197 | A | * | 2/1939 | Glidden ........................ 36/9 R |
| 2,317,880 | A | * | 4/1943 | Bingham, Jr. .................... 36/4 |
| 2,440,563 | A | * | 4/1948 | Woyach ......................... 36/7.3 |
| 2,582,298 | A | * | 1/1952 | Ushakoff .................. 12/146 C |
| 2,897,610 | A | * | 8/1959 | Campagna ........................ 36/4 |
| 2,982,033 | A | * | 5/1961 | Bingham, Jr. ................ 40/636 |
| 3,646,497 | A | | 2/1972 | Gillikin |
| 3,672,078 | A | | 6/1972 | Fukuoka |
| 3,708,815 | A | | 1/1973 | Jurasek et al. |
| 3,921,313 | A | * | 11/1975 | Mahide et al. .................... 36/4 |
| 3,983,642 | A | | 10/1976 | Liao |
| 4,103,440 | A | | 8/1978 | Lawrence |
| 4,266,314 | A | | 5/1981 | Londner epouse Ours |
| 4,279,083 | A | | 7/1981 | Dilg |
| 4,295,238 | A | * | 10/1981 | Clark ..................... 12/142 RS |
| 4,333,192 | A | | 6/1982 | Stockli et al. |
| 4,604,816 | A | * | 8/1986 | Davison ........................ 36/1.5 |
| 4,606,139 | A | | 8/1986 | Silver |
| 4,704,810 | A | * | 11/1987 | Massengale ................. 36/130 |

(Continued)

FOREIGN PATENT DOCUMENTS

DE 2 157 413 11/1971

(Continued)

*Primary Examiner*—Marie Patterson
(74) *Attorney, Agent, or Firm*—Goodwin Procter LLP

(57) ABSTRACT

The present invention relates to a shoe and the manufacture thereof that includes an inner shoe with an upper side and a lower side and a stitch-free shell. The stitch-free shell encompasses the upper side of the inner shoe. The shell may be produced in two or more pieces and subsequently joined. The shoe can also include a sole attached to the lower side of the inner shoe.

27 Claims, 5 Drawing Sheets

U.S. PATENT DOCUMENTS

| | | | |
|---|---|---|---|
| 4,745,693 A | | 5/1988 | Brown |
| 4,819,345 A | * | 4/1989 | Mulcahy et al. ............. 36/17 R |
| 4,858,337 A | * | 8/1989 | Barma .............................. 36/4 |
| 4,878,300 A | | 11/1989 | Bogaty |
| 5,065,531 A | | 11/1991 | Prestridge |
| 5,083,385 A | | 1/1992 | Halford |
| 5,144,759 A | * | 9/1992 | Mascotte ................... 36/7.1 R |
| 5,317,822 A | | 6/1994 | Johnson |
| 5,339,543 A | | 8/1994 | Lin |
| 5,351,352 A | * | 10/1994 | Chillemi ................... 12/146 C |
| 5,353,526 A | | 10/1994 | Foley et al. |
| 5,410,821 A | | 5/1995 | Hilgendorf |
| 5,533,280 A | | 7/1996 | Halliday |
| 5,647,150 A | | 7/1997 | Romanato et al. |
| 5,778,564 A | | 7/1998 | Kettner |
| 5,822,888 A | | 10/1998 | Terry |
| 5,875,566 A | | 3/1999 | Bourdeau et al. |
| 5,885,500 A | | 3/1999 | Tawney et al. |
| 5,950,333 A | * | 9/1999 | Tsen .......................... 36/7.1 R |
| 6,038,792 A | * | 3/2000 | Hauter ......................... 36/133 |
| 6,061,929 A | * | 5/2000 | Ritter ........................... 36/107 |
| 6,467,198 B1 | * | 10/2002 | James .......................... 36/115 |
| 6,519,876 B1 | | 2/2003 | Geer et al. |
| 6,558,784 B1 | * | 5/2003 | Norton et al. ............ 428/304.4 |
| 2001/0016992 A1 | * | 8/2001 | Gross ............................. 36/84 |

FOREIGN PATENT DOCUMENTS

| | | |
|---|---|---|
| DE | 43 09 106 | 9/1993 |
| DE | 299 18 278 | 1/2000 |
| EP | 0 510 384 | 10/1992 |
| EP | 0 551 881 | 7/1993 |
| FR | 2 530 126 | 1/1984 |
| FR | 2 633 161 | 12/1989 |
| GB | 2 232 577 | 12/1990 |
| GB | 2 250 416 | 6/1992 |
| NL | 7807 177 | 1/1980 |
| SU | 1741757 | 6/1992 |
| WO | WO 86/04489 | 8/1986 |

* cited by examiner

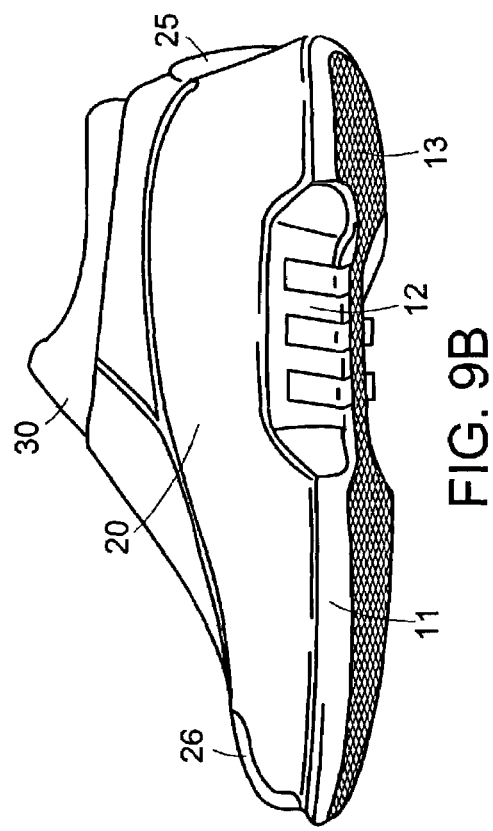
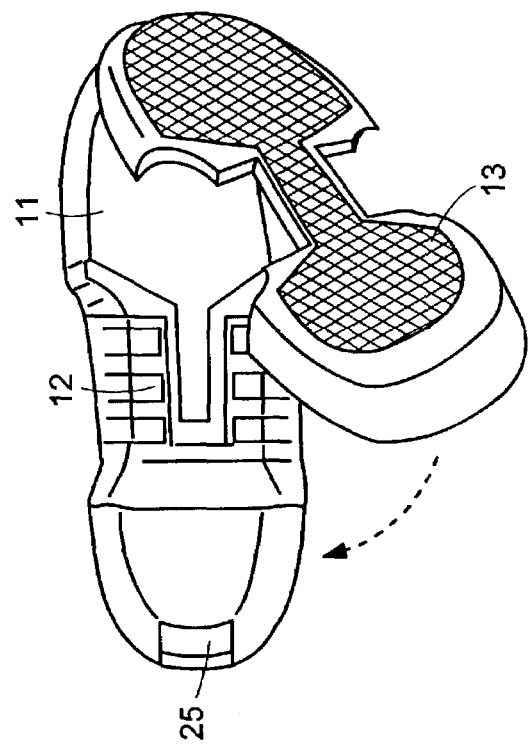
FIG. 9B
FIG. 9A

SHOE UPPER AND METHODS OF MANUFACTURE

CROSS REFERENCE TO RELATED APPLICATIONS

This application incorporates by reference, and claims priority to and the benefit of, German patent application serial number 102 22 897.3, filed on May 23, 2002.

TECHNICAL FIELD

The present invention relates to a shoe. More specifically, the present invention relates to a shoe upper and methods of manufacturing the same.

BACKGROUND

Presently, the construction of a shoe upper for a sports shoe requires a substantial amount of manual labor. While the production of a sole of a modem sports shoe can be automated to a great extent, the stitching of the different materials of the upper still requires a significant amount of manual labor.

The upper of a shoe typically includes a soft inner part that provides comfort to the wearer of the shoe. The inner part is stitched to a more stable material, for example, leather, either alone or in combination with different synthetics. The more stable material forms the outside of the upper of the shoe and provides the desired stability, wear resistance, and support to the wearer's foot. This type of construction results in multiple seams extending over the upper of the shoe. The seams interconnect the outer materials to the softer material(s) of the inner part. As stated above, these seams are typically created manually or semi-manually.

A different approach is used to create ski boots for downhill skiing. The complete shoe, i.e., the boot, including the sole, is produced as a single plastic part. Subsequently, an inner part is inserted into the single plastic part and, if necessary, attached to the surrounding plastic housing. A shoe construction of this type primarily provides protection of the ankle against injuries during skiing. It is, however, usually difficult to walk while wearing these shoes, because the plastic housing lacks flexibility.

It is, therefore, an object of the present invention to provide a shoe, in particular a sports shoe, with a high degree of wearing comfort, but low manufacturing costs. Another object of the present invention is to provide a method of manufacturing a shoe that reduces the amount of manual labor required to produce the upper.

SUMMARY OF THE INVENTION

Generally, the invention relates to a shoe that has an upper that includes a stitch-free shell. In contrast to known shoes, the stability necessary for the upper of the shoe and the desired support of the foot is not provided by additional material layers stitched to the inner shoe, but by a stitch-free plastic shell surrounding only the upper side of the shoe. This shell can be produced at low cost, because the lower side of the inner shoe, which transmits the interaction with the ground to the foot, is not encompassed by the plastic shell. In contrast to ski boots, the flexibility of the shoe in the sole area is completely maintained in a shoe constructed in accordance with the invention.

In one aspect, the invention relates to a shoe having an inner shoe and a stitch-free shell. The inner shoe includes an upper side and a lower side. The stitch-free shell encompasses only the upper side of the inner shoe.

In various embodiments of this aspect of the invention, the stitch-free shell may encompass substantially the entire upper side of the inner show. The stitch-free shell may include a medial half-shell and a lateral half-shell. This facilitates designing the medial and the lateral sides of the upper of the shoe independently from each other, either with respect to their function by, for example, using different materials or material thicknesses, or with respect to their appearance. Additionally, a toe cap may be disposed in a toe area of the shoe and/or a heel cap may be disposed in a heel area of the shoe. The caps can be either directly integrated into the stitch-free shell or be additionally attached from the outside.

In additional embodiments, the stitch-free shell may be constructed of a blow-molded material. Polyurethane (PU) is one example. In a further embodiment, the blow-molded material includes a polyurethane-foil. In an alternative embodiment, the stitch-free shell is composed of a plastic. The blow-molding technique, as well as the use of particular materials, leads to a comparatively flexible plastic shell, such that the upper of the shoe is not too rigid. Furthermore, the use of the PU-foil facilitates the easy design of the appearance of the shoe by printing different patterns on the PU-foil.

In further embodiments, the shoe includes a sole unit. The sole unit is attached to the lower side of the inner shoe. In other embodiments, the sole unit includes a midsole and an outsole. The midsole is attached to the inner shoe and the outsole is attached to the midsole. This construction assures the desired cushioning for the foot of the wearer and the wear resistance necessary for a long shoe life. In one embodiment, the stitch-free shell encompasses the sole unit at least partly about the side. The sole unit may also include a support element disposed in an arch area of the sole. In yet a further embodiment, the stitch-free shell includes at least one recess for receiving the support element.

In another aspect, the invention relates to a method of manufacturing a shoe. The method includes the steps of providing an inner shoe that includes an upper side and a lower side, forming a stitch-free shell, and attaching the stitch-free shell to only the upper side of the inner shoe. The stitch-free shell may be attached such that it encompasses substantially the entire upper side of the inner shoe. The attaching of the stitch-free plastic shell by, for example, gluing the shell to the upper side of the inner shoe, replaces the complicated stitched outer layers of conventional shoe uppers. Further, the shell provides the stability desired for the upper of the shoe.

In one embodiment, the step of forming the shell includes the steps of forming two half-shells and interconnecting the two half-shells to form the stitch-free shell. In various embodiments, the method may include the additional steps of attaching a toe cap in a toe area of the shoe and attaching a heel cap in a heel area of the shoe. In another embodiment, the step of forming the shell includes blow-molding a material, for example, polyurethane, to create the stitch-free shell. In a further embodiment, the forming step also includes binding a PU-foil to the shell. The PU-foil may be a synthetic PU-foil.

In yet another embodiment, the method includes the step of attaching a sole unit to the lower side of the inner shoe. In a further embodiment, the attaching step includes the steps of attaching a midsole to the lower side of the inner shoe and attaching an outsole to a bottom surface of the midsole. In still a further embodiment, the method includes the step of attaching a support element to the bottom surface of the midsole.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 9A and 9B are schematic views of a further step of the method of manufacturing a shoe first depicted in FIGS. 3A and 3B.

DETAILED DESCRIPTION OF THE INVENTION

Embodiments of the present invention are described below. It is, however, expressly noted that the present invention is not limited to these embodiments, but rather the intention is that variations, modifications, and equivalents that are apparent to the person skilled in the art are also included. In particular, the present invention is not intended to be limited to sports shoes, but rather it is to be understood that the present invention can also be used for any article of footwear or portions thereof. Further, only a left or right upper, sole, and/or shoe is depicted in any given figure; however, it is to be understood that the left and right uppers/soles/shoes are typically mirror images of each other and the description applies to both left and right uppers/soles/shoes. In certain activities that require different left and right shoe configurations or performance characteristics, the shoes need not be mirror images of each other.

Figure 1:
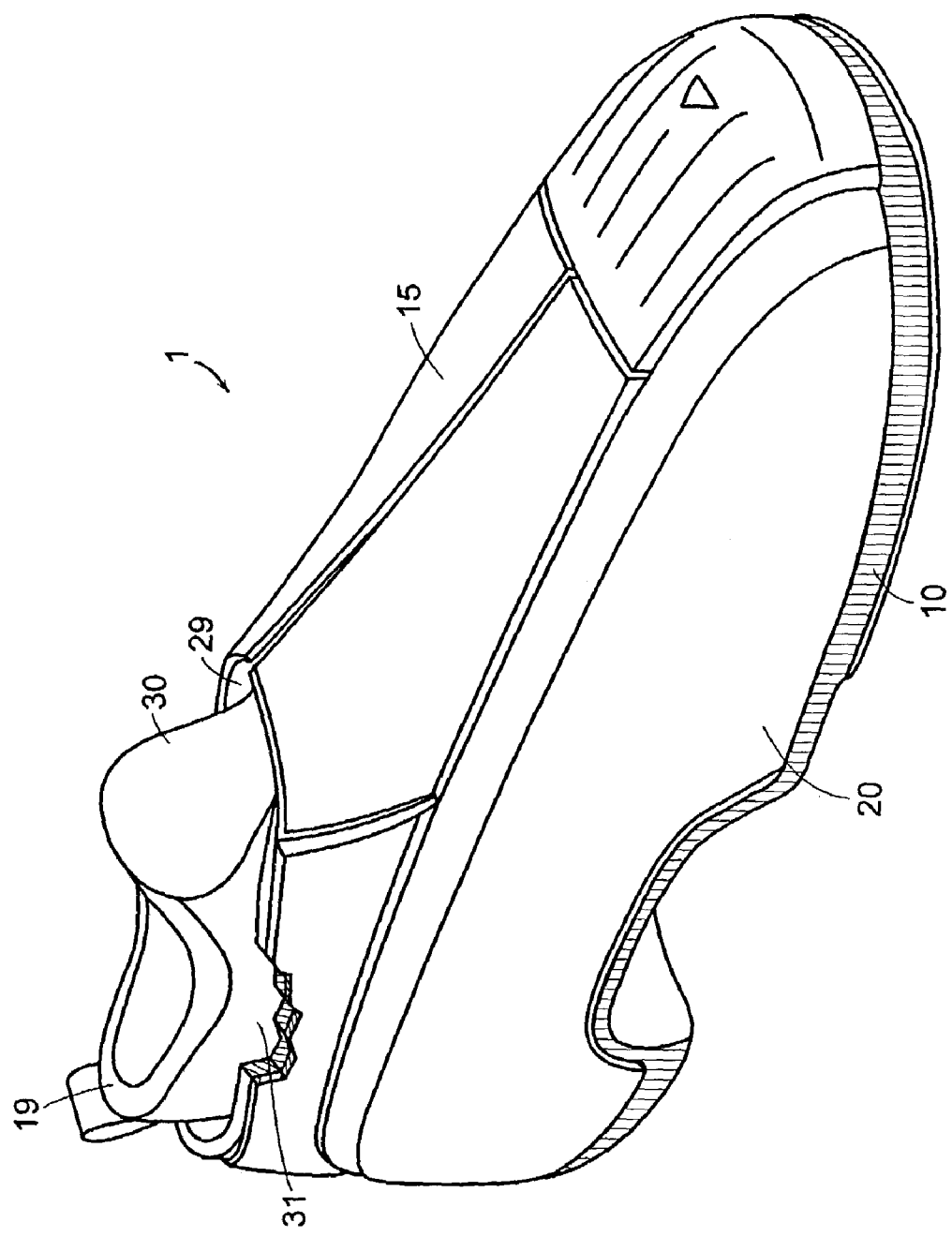
FIG. 1 is a schematic perspective view of a shoe in accordance with an embodiment of the invention.

FIG. 1 shows an overall view of an embodiment of a shoe 1 constructed in accordance with the invention. The shoe 1 includes an upper 15 and a sole unit 10. The shoe upper 15 includes a shell 20 arranged above the sole unit 10. The shoe 1 further includes an inner shoe 30 having an upper side 31 (FIG. 3A) and a lower side 32 (FIG. 3A) arranged inside the shell 20, such that an upper end 19 of the inner shoe 30 projects out of an opening 29 in the plastic shell 20. As shown in FIG. 1, the shell 20 encompasses the upper side 31 of the inner shoe 30. This configuration enables unlimited flexibility of the sole unit 10 and the lower side 32 of the inner shoe 30. The shell 20 provides stability and support to the shoe 1.

In one embodiment, the shell 20 is made from polyurethane (PU), although other plastic materials are contemplated. The three-dimensional shape of the shell 20 is controlled by a blow-molding process. In other embodiments, other methods of processing plastic materials known to a person skilled in the art, for example, foaming of one or more starting materials, can be used to create the desired shape of the shell 20. Alternative materials and manufacturing methods are further described hereinbelow.

Figure 2A:
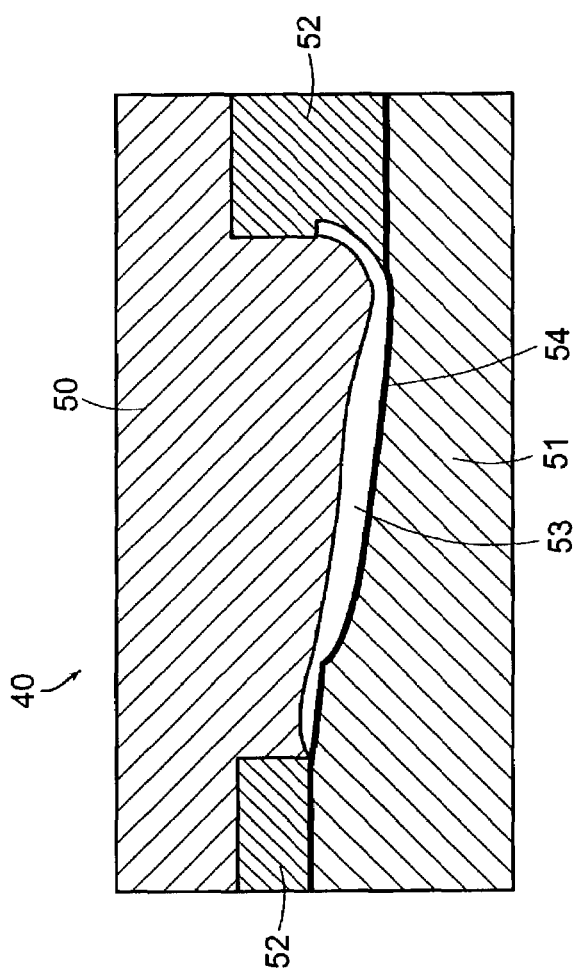
FIG. 2A is a schematic cross-sectional view of a tool for manufacturing a shell in accordance with the invention.

FIG. 2A shows one embodiment of a blow-molding tool 40 used in conjunction with a chosen material to create at least a portion of the shell 20. A starting material, for example PU, is inserted as a semi-finished product into a cavity 53 that is defined by an upper plate 50, a lower plate 51, and two side plates 52. The plates 50, 51, 52 collectively form the tool 40. Subsequently, high pressure is applied to press the starting material against the interior walls of the cavity 53. The pressure, in combination with the shape of the cavity 53, results in the shell 20 taking the desired shape, i.e., the shape of the cavity 53. The molding process is typically performed at an elevated temperature, for example, 130° F. to 210° F. The temperature is dependent upon the material used. At an elevated temperature, the starting material is typically soft during the blow-molding process. The final mechanical properties of the shell 20 are obtain after the starting material cools.

Figure 2C:
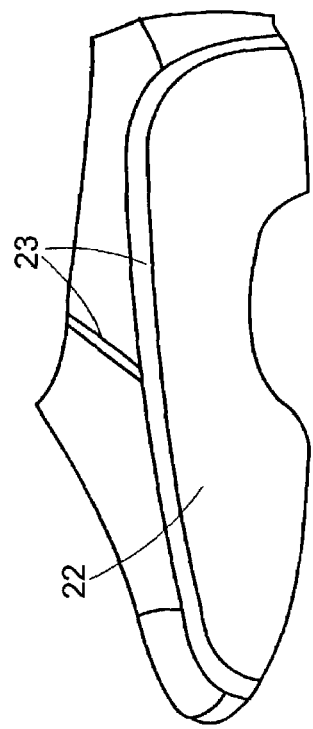
FIGS. 2B and 2C are schematic side views of a medial half-shell and a lateral half-shell manufactured with the tool of FIG. 2A.
Figure 2B:
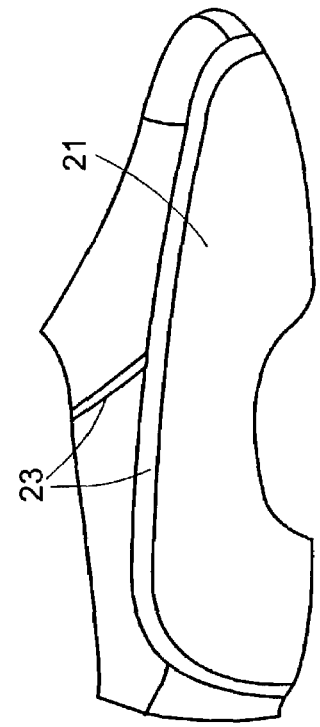

As shown, the cavity 53 serves to manufacture only one half of the shell 20. In one embodiment, a lateral half-shell 21 and a medial half-shell 22, as shown in FIGS. 2B and 2C, are produced separately. Subsequently, the lateral half-shell 21 and the medial half-shell 22 are interconnected by, for example, gluing or other interconnection methods. Different materials may be used to manufacture each of the lateral half-shell 21 and the medial half-shell 22. This may be desirable for either technical reasons, if different mechanical properties are desired for the lateral and the medial sides, or for design reasons. Alternatively, the complete shell 20 can be manufactured as a single continuous part. In addition, an individual or plurality of structures 23 may selectively influence the flexibility of the lateral half-shell 21 and/or the medial half-shell 22. For example, the structures 23 may be a set of ribs that adds strength to the upper 15. Alternatively or additionally, the structures 23 may serve an esthetic purpose.

Additionally, a piece of foil 54 may be inserted into the cavity 53, such that the foil 54 is in contact on its lower side with the lower plate 51. The foil 54 binds to the formed material during the blow-molding process. The foil 54 may also be made of PU or of a different material that reliably bonds to the blow-molded body during the blow-molding process. The foil 54 improves the outer surface properties of the finished shell 20. Additionally, the foil 54 facilitates the modification of the aesthetic design of the shell 20. For example, different colors and patterns may be integrated into the foil 54. Alternatively, the foil 54 may be transparent. In such an embodiment, the blow-molded material that forms the shell 20 is seen through the foil 54.

In alternative embodiments, the shell 20 may be manufactured by other methods. For example, injection molding or extrusion may be used to manufacture the shell 20. Extrusion processes may be used to provide a uniform geometric shape. Alternatively or additionally, various components can be attached to the shell 20, for example, a toe cap 26 can be melted or bonded to the shell 20 with a liquid epoxy or hot melt adhesive, such as ethylene vinyl acetate (EVA). In addition to adhesive bonding, solvent bonding, which entails using a solvent to facilitate fusing, may be used. The various components can be separately formed and subsequently attached or the components can be integrally formed by a single dual injection step, where two or more materials of differing densities are injected simultaneously into a mold.

Generally, the various components of the shoe 1 can be manufactured from any suitable polymeric material or combinations of polymeric materials, either with or without reinforcement. Suitable materials include: polyurethanes, such as a thermoplastic polyurethane (TPU); EVA; thermoplastic polyether block amides, such as the Pebax® brand sold by Elf Atochem; thermoplastic polyester elastomers, such as the Hytrel® brand sold by DuPont; thermoplastic elastomers such as the Santoprene® brand by Advanced Elastomer Systems, L.P.; thermoplastic olefin; nylons, such as nylon 12, which may include 10 to 30 percent or more glass fiber reinforcement; silicones; polyethylenes; acetal; and equivalent materials. Reinforcement, if desired, may be by inclusion of glass or carbon graphite fibers or para-aramid fibers, such as the Kevlar® brand sold by DuPont, or other similar methods. Also, the polymeric materials may be used in combination with other materials, for example natural or synthetic rubber. Other suitable materials will be apparent to those skilled in the art.

Figure 3A:
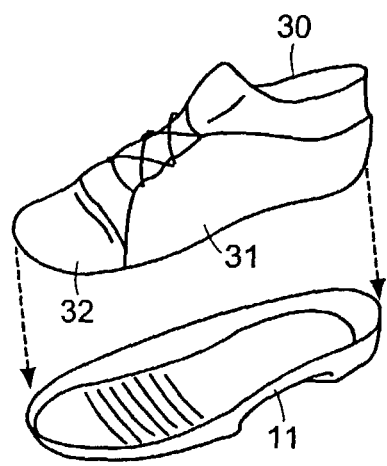
FIGS. 3A and 3B are schematic views of a step of a method of manufacturing a shoe in accordance with the invention.
Figure 3B:
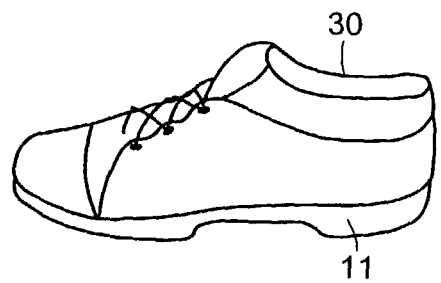

FIG. 3A through FIG. 9B depict an embodiment of a manufacturing process used to create the shoe 1 depicted in FIG. 1. With reference to FIG. 3A, an inner shoe 30 is provided that has an upper side 31 and a lower side 32. Any number of known techniques may be used to manufacture the inner shoe 30. The inner shoe 30 is typically constructed of a soft material to provide a high degree of wearing comfort. With reference to FIG. 3B, the lower side 32 of the inner shoe 30 is connected to a midsole 11. This connection may be made by gluing or any other conventional bonding techniques.

Figure 4A:
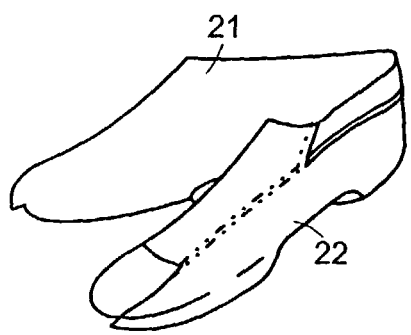
FIGS. 4A and 4B are schematic views of a further step of the method of manufacturing a shoe first depicted in FIGS. 3A and 3B.
Figure 4B:
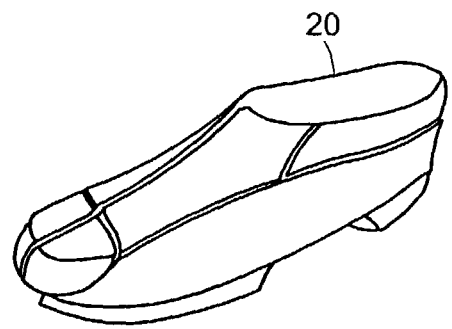

FIG. 4A depicts the medial half-shell 21 and the lateral half-shell 22 of the finished shell 20 prior to interconnection. FIG. 4B shows the completed shell 20. As previously described, gluing may be used to interconnect the medial half-shell 21 and the lateral half-shell 22. In alternative embodiments, cementing or other techniques, such as plastic welding, fusing, and the like may be used to perform the interconnection. It is, however, not necessary to manually or semi-manually stitch the medial half-shell 21 and the lateral half-shell 22 together. Once complete, the shell 20 is attached to the inner shoe 30 as described below.

Figure 5A:
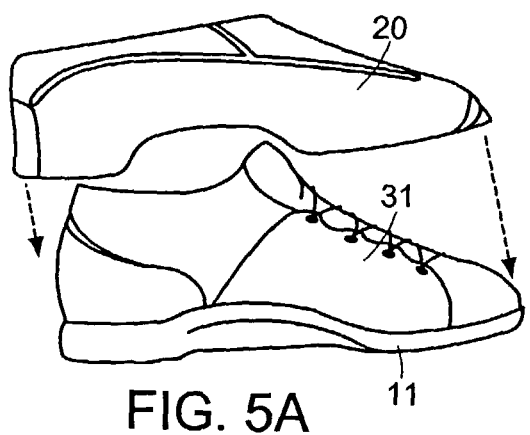
FIGS. 5A and 5B are schematic views of a further step of the method of manufacturing a shoe first depicted in FIGS. 3A and 3B.
Figure 5B:
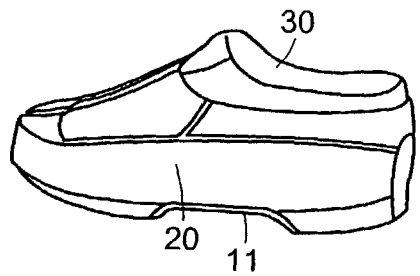

FIG. 5A shows the shell 20 being guided, from above, onto the upper side 31 of the inner shoe 30. Once in place, the shell 20 encompasses the upper side 31 of the inner shoe 30, as depicted in FIG. 5B. In one embodiment, the shell 20 extends downwardly such that at least a portion of a side of the midsole 11 is also covered. Once in place, the shell 20 is anchored to the upper side 31 of the inner shoe 30. In one embodiment, the shell 20 is permanently connected to the upper side 31 of the inner shoe 30. Gluing and cementing are examples of permanent connection techniques. In an alternative embodiment, the shell 20 is releasably attached to the upper side 31 of the inner shoe 30. For example, Velcro® brand hook and loop pads sold by Velcro Industries B.V. may be used to connect releasably the upper side 31 of the inner shoe 30 to the shell 20. The connection of the shell 20 to the upper side 31 of the inner shoe 30 provides stabilization to the shoe upper 15. The shell 20 is an outer frame that provides the desired stability for the complete shoe structure. As shown, no manually or semi-manually stitched seams are necessary in the upper of the shoe. This reduces not only the manufacturing costs of the shoe, but the shell 20 also allows for providing new designs to the upper 15 of the shoe 1, because of the particularly smooth surface of the shell 20.

Figure 6A:
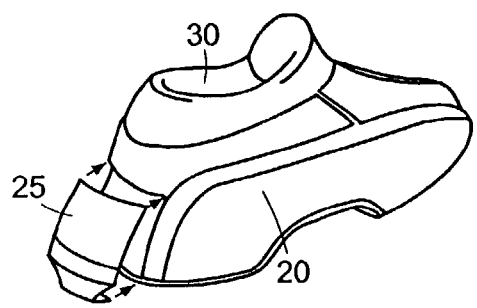
FIGS. 6A and 6B are schematic views of a further step of the method of manufacturing a shoe first depicted in FIGS. 3A and 3B.
Figure 6B:
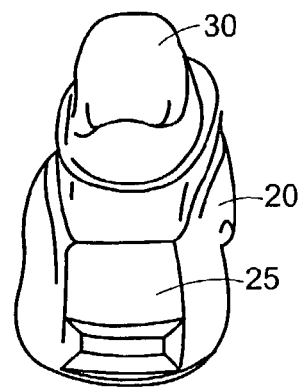

FIGS. 6A and 6B show the attachment of a heel cap 25 to the shell 20. The heel cap 25 provides reinforcement to an area of the shell 20 that is typically subjected to a higher load than other areas of the shoe 1. The heel cap 25 is attached to the shell 20 using any of the before-mentioned techniques. Attaching the heel cap 25 after the connection of the shell 20 to the upper side 31 of the inner shoe 30 facilitates the use of different materials in the heel cap 25 other than that of the shell 20. For example, wear-resistant rubber mixtures may be used to form the heel cap 25. In an alternative embodiment, the heel cap 25 may be a hide glued section or the like, of one or both of the medial half-shell 21 or lateral half-shell 22 of the shell 20.

Figure 7A:
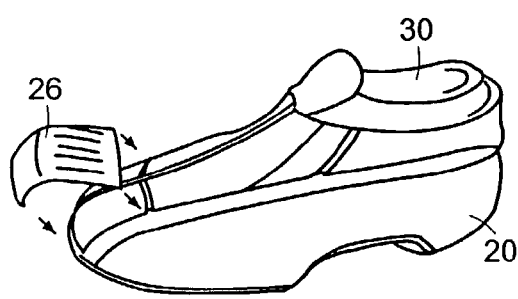
FIGS. 7A and 7B are schematic views of a further step of the method of manufacturing a shoe first depicted in FIGS. 3A and 3B.
Figure 7B:
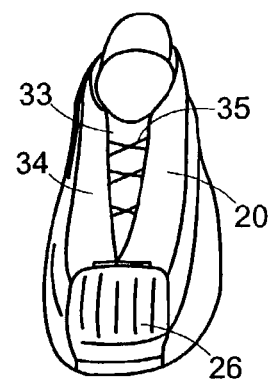

FIGS. 7A and 7B show the attachment of a toe cap 26 to the shell 20. The toe cap 26 provides reinforcement to an area of the shell 20 that may be subjected to a higher load than other areas of the shoe 1. The toe cap 26 is attached to the shell 20 using any of the before-mentioned techniques. Attaching the toe cap 26 after the connection of the shell 20 to the upper side 31 of the inner shoe 30 facilitates the use of different materials in the toe cap 26 other than that of the shell 20. For example, wear-resistant rubber mixtures may be used to form the toe cap 26. In an alternative embodiment, the toe cap 26 may be a hide glued section or the like, of one or both of the medial half-shell 21 or lateral half-shell 22 of the shell 20. Further, it is also possible to provide other reinforcement mechanisms in different regions of the shoe. Also it is possible to initially integrate the reinforcement mechanisms into the medial half and/or the lateral half of the shell 20.

Additionally, FIG. 7B depicts another aspect of the present invention. A gap 33 having a predetermined size is disposed in an instep region 34 of the shell 20. In one embodiment, lacings 35 secure the inner shoe 30 to the foot of a wearer. In an alternative embodiment, it is possible to place the lacings 35 or another connection device, for example buckles or straps having Velcro®, on the shell 20 to releasably attach the shoe to the foot of a wearer by modifying the width of the gap 33.

Figure 8A:
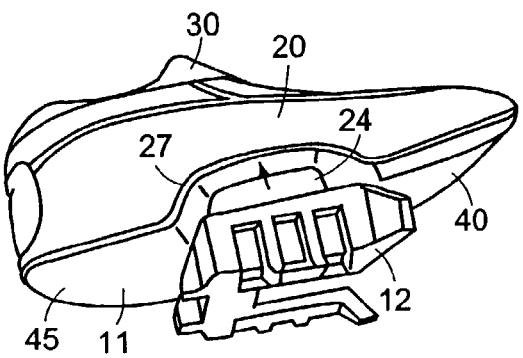
FIGS. 8A and 8B are schematic views of a further step of the method of manufacturing a shoe first depicted in FIGS. 3A and 3B.
Figure 8B:
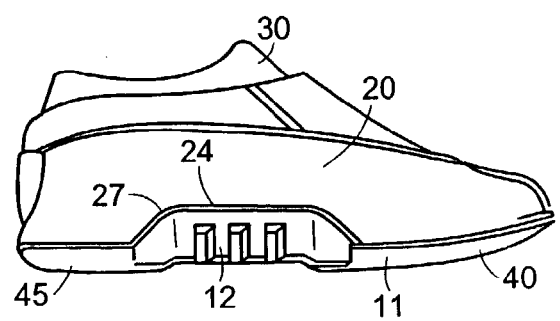

FIGS. 8A and 8B depict the step of finishing the sole unit 10 in accordance with the principles of the invention. A support element 12 is disposed in the arch area 24 of the midsole 11. The support element 12 may be, for example, a torsion support that influences the rotatability of a forefoot region 40 of the sole 11 with respect to a rearfoot 45 region of the sole 11. In. one embodiment, at least a portion of the support element 12 is disposed in a recess 27 that is formed in the side areas of the shell 20. In an alternative embodiment, the support element 12 is disposed around the side areas of the plastic shell 20.

FIGS. 9A and 9B depict a final manufacturing step. An outsole 13 is attached to the midsole 11 and the support element 12 from below. The shape and the material properties of the support element 12, the midsole 11, and the outsole 13 are selected based upon an intended use of the shoe. For example, certain materials may be used to manufacture a basketball shoe, while different materials may be used to manufacture a soccer shoe. The outsole 13 shown extends along substantially the entire length of the shoe; however, the outsole 13 could be a plurality of separate sole elements and/or only extend along a portion of the midsole 11. Optionally, cleats or spikes may be provided.

As described above, one advantage of the present invention is that it allows the manufacture of complete sports shoe from pre-fabricated components that essentially only have to be connected to each other. This reduces the amount of manual labor required to manufacture a shoe in accordance with the invention, as compared to known shoes that require the complicated stitching of different material layers.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. A shoe comprising:
    an inner shoe comprising an upper side and a bottom surface;
    a sole unit attached to the bottom surface of the inner shoe; and
    a stitch-free shell encompassing the upper side of the inner shoe without extending over the bottom surface of the inner shoe, wherein the stitch-free shell comprises two separately formed shell portions, and wherein substantial portion of the stitch free shell is anchored to a substantial portion of the upper side of the inner shoe.

2. The shoe of claim 1, wherein the stitch-free shell encompasses substantially an entire upper side of the inner shoe.

3. The shoe of claim 1, wherein the stitch-free shell comprises a medial half-shell and a lateral half-shell.

4. The shoe of claim 1 further comprising a toe cap disposed in a toe area of the shoe.

5. The shoe of claim 1 further comprising a heel cap disposed in a heel area of the shoe.

6. The shoe of claim 1, wherein the stitch-free shell comprises a blow-molded material.

7. The shoe of claim 6, wherein the blow-molded material comprises a polyurethane.

8. The shoe of claim 7, wherein the blow-molded material further comprises a polyurethane-foil.

9. The shoe of claim 1 wherein the stitch-free shell comprises a plastic.

10. The shoe of claim 1, wherein the stitch free shell is anchored to the upper side of the inner shoe by at least one of a glue, a cement, and a hook and loop type fastener.

11. The shoe of claim 1, wherein each separately formed shell portion is anchored to the upper side of the inner shoe.

12. The shoe of claim 1, wherein the sole unit comprises a midsole and an outsole, the midsole being attached to the inner shoe and the outsole being attached to the midsole.

13. The shoe of claim 1, wherein the sole unit comprises a supporting element disposed in an arch area of the sole.

14. The shoe of claim 1, wherein the stitch-free shell encompasses the sole unit at least partly about the side.

15. The shoe of claim 13 wherein the stitch-free shell comprises at least one recess for receiving the supporting element.

16. A method of manufacturing a shoe comprising the steps of:
    providing an inner shoe comprising an upper side and a bottom surface;
    attaching a sole unit to the bottom surface of the inner shoe;
    forming a stitch-free shell; and
    anchoring a substantial potion of the stitch free shell to a substantial portion of the upper side of the inner shoe without extending over the bottom surface of the inner shoe wherein the step of forming the shell comprises:
    separately forming two shell portions; and
    interconnecting the two shell portions to form the stitch-free shell.

17. The method of claim 16, wherein the step of forming the shell comprises:
    forming two half-shells; and
    interconnecting the two half-shells to form the stitch-free shell.

18. The method of claim 16, wherein the step of forming the shell comprises blow-molding a material to create the stitch-free shell.

19. The method of claim 18 wherein the material comprises a polyurethane.

20. The method of claim 19, wherein the forming step further comprises bonding a polyurethane-foil to the shell.

21. The shoe of claim 16, wherein the stitch free shell is anchored to the upper side of the inner shoe by at least one of a glue, a cement, and a hook and loop type fastener.

22. The shoe of claim 16, wherein each separately formed shell portion is anchored to the upper side of the inner shoe.

23. The method of claim 16, wherein the step of attaching the sole unit comprises:
    attaching a midsole to the lower side of the inner shoe; and
    attaching an outsole to a bottom surface of the midsole.

24. The method of claim 23 further comprising the step of attaching a supporting element to the lower side of the midsole.

25. The method of claim 16 further comprising the step of attaching a toe cap in a toe area of the shoe.

26. The method of claim 16 further comprising the step of attaching a heel cap in a heel area of the shoe.

27. The method of claim 16, wherein the stitch-free shell encompasses substantially an entire upper side of the inner shoe.

* * * * *